United States Patent
Andre et al.

(10) Patent No.: US 6,214,462 B1
(45) Date of Patent: Apr. 10, 2001

(54) ENAMELING LACQUER, PROCESS FOR THE MANUFACTURE OF THE LACQUER AND APPLICATION OF THE LACQUER TO ENAMELING WIRES

(75) Inventors: Raymond Andre, Autreville; Jean-Yves Barraud, Paris; Germaine Binder, Sinceny; Jean-François Fauvarque, Paris; Pierre-Yves Le Tiec, Vouel; Laurent Preux, Chauny, all of (FR)

(73) Assignee: Alcatel N.V., Amsterdam (NL)

( * ) Notice: Subject to any disclaimer, the term of this patent is extended or adjusted under 35 U.S.C. 154(b) by 0 days.

(21) Appl. No.: 08/312,493

(22) Filed: Sep. 26, 1994

Related U.S. Application Data

(63) Continuation of application No. 07/655,649, filed on Feb. 13, 1991, now abandoned.

(30) Foreign Application Priority Data

Feb. 16, 1990 (FR) .................................................. 90 01895

(51) Int. Cl.[7] .............................. H01B 7/00; D02G 3/00; C08G 77/04
(52) U.S. Cl. .......................... 428/375; 428/378; 428/379; 428/380; 428/391; 428/393; 174/110 SR; 174/110 N; 174/120 S; 174/120 SR; 528/26; 528/28; 528/45; 525/63; 525/431; 525/452; 525/474
(58) Field of Search ..................................... 428/375, 378, 428/379, 380, 393, 391; 174/110 SR, 110 N, 120 S, 120 SR; 528/26, 28, 45; 525/63, 431, 452, 474

(56) References Cited

U.S. PATENT DOCUMENTS

| | | |
|---|---|---|
| 3,413,148 | 11/1968 | Sattler et al. . |
| 3,632,440 | * 1/1972 | Preston ................................... 525/474 |
| 3,674,891 | * 7/1972 | Wheeler, Jr. ........................... 525/474 |
| 4,130,708 | * 12/1978 | Friedlander et al. ................... 528/28 |
| 4,348,460 | 9/1982 | Saunders et al. . |
| 4,499,149 | * 2/1985 | Berger ................................... 428/450 |
| 4,652,598 | * 3/1987 | Edelman ................................. 524/99 |
| 4,659,777 | * 4/1987 | Riffle et al. ............................ 525/100 |
| 4,693,936 | 9/1987 | McGregor et al. . |
| 4,769,424 | * 9/1988 | Takekoshi et al. .................... 525/435 |
| 4,812,518 | 3/1989 | Haubennestel et al. . |

FOREIGN PATENT DOCUMENTS

| | | |
|---|---|---|
| 2533357 | 9/1982 | (FR) . |
| 1230189 | 4/1971 | (GB) . |

* cited by examiner

Primary Examiner—Terrel Morris
Assistant Examiner—Cheryl Juska
(74) Attorney, Agent, or Firm—Sughrue, Mion, Zinn, Macpeak & Seas, PLLC

(57) ABSTRACT

An enameling lacquer comprises a base first polymer and a copolymer which is compatible with said first polymer and which contains polymeric chains selected from polysiloxanes, fluorinated chains and alkane chains. The lacquer is of particular application to an enameled wire comprising at least one layer of an enamel obtained by reticulation of the lacquer.

17 Claims, 1 Drawing Sheet

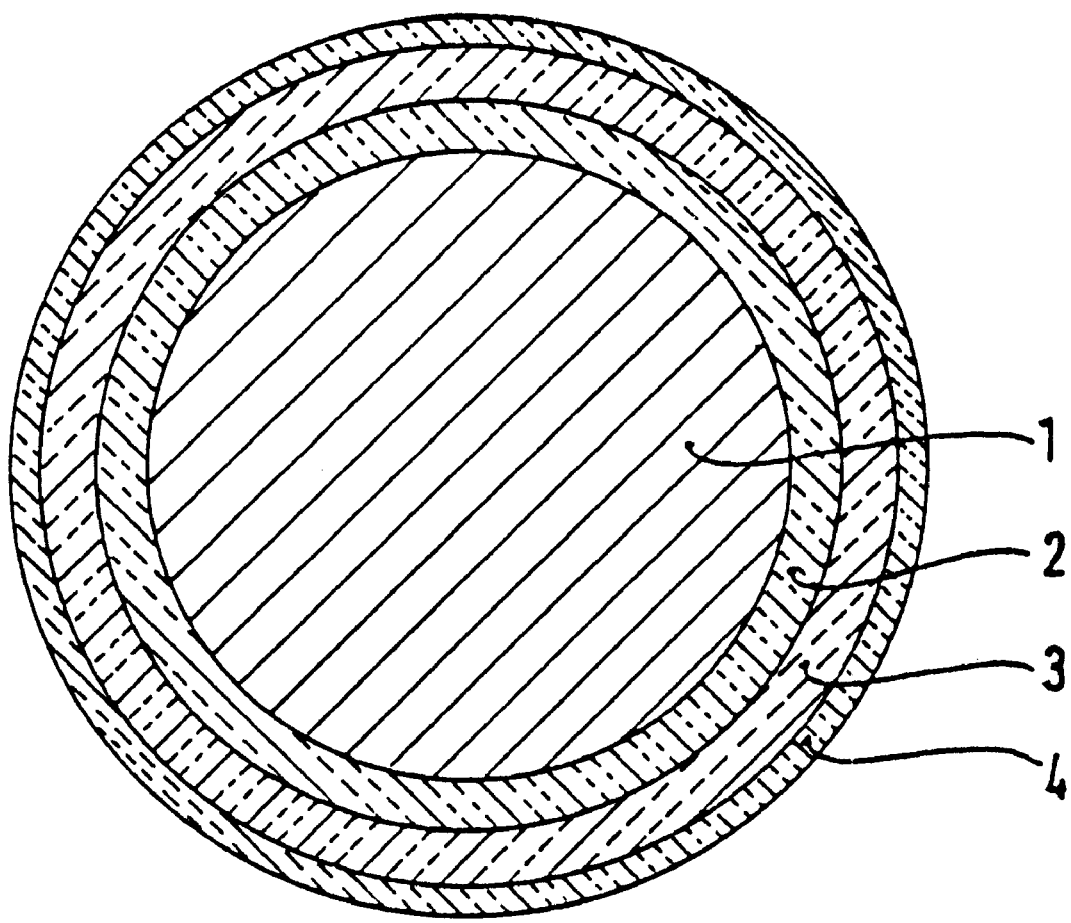

ENAMELING LACQUER, PROCESS FOR THE MANUFACTURE OF THE LACQUER AND APPLICATION OF THE LACQUER TO ENAMELING WIRES

CROSS REFERENCE TO RELATED APPLICATIONS

This is a continuation of application Ser. No. 07/655,649 filed Feb. 13, 1991, now abandoned.

BACKGROUND OF THE INVENTION

1. Field of the Invention

The present invention concerns an enameling lacquer and a process for the manufacture of the lacquer.

The invention is particularly but not exclusively applicable to enameling wire for use in the windings of electric motors or any other electrical components, the wire being applied by an automatic machine, for example.

2. Description of the Prior Art

In the case given of electric motor windings, it is imperative that the windings are as compact as possible and can easily be introduced into an appropriate housing without affecting the insulating properties of the lacquer.

Windings are produced at high speeds; the enameled conductor is subjected to friction and to severe mechanical stress which may damage the insulation and result in irregular winding of the conductor, for example during placement in stator winding slots. There could be serious effects on the insulation properties, service life and efficiency of the component.

A number of solutions have been proposed which are intended to reduce the coefficient of friction of enameled electrical conductors, to provide a smooth surface and to enable them to be wound easily.

A first solution consists in lubricating the exterior of the enameled conductor by coating the surface with a lubricating substance such as paraffin wax, oil, a natural or synthetic wax or polysiloxane. The results are inadequate and irregular.

A second solution consists in providing the conductor with an external layer of polyamide 6—6, trade name NYLON, well known for its slippery qualities. Results show that this process improves smoothness, but the nylon reduces the thermal characteristics of wires with a thermal index of greater than 200° C.

A third solution consists in introducing an internal lubricating agent into the outer layer of a conductor. The polymers most frequently used for this application are aliphatic or aromatic polyamides, aromatic polyamide imides, polyester imides, polyimides, polyvinyl alcohol acetals, mixed aromatic/aliphatic polyamides, polyepoxy compounds and polyphenoxy compounds.

French patent FR-A-2 533 357 indicates how a lacquer can be made which incorporates in the polymer less than 0.3% of a particular form of internal solid lubricant. This technique uses a lubricant which is incompatible with the base polymer. This incompatibility effectively expels the lubricant particles onto the outer surface of the outer layer, improving its slippery qualities. Such a process is very difficult to carry out industrially, however. Mutual incompatibility of the two materials prevents incorporation of a sufficient quantity of lubricant, resulting in frequent irregularities in the conductor which are unacceptable to the user.

The aim of the present invention is to overcome these problems.

SUMMARY OF THE INVENTION

In one aspect, the present invention consists in an enameling lacquer comprising a base first polymer and a copolymer which is compatible with said first polymer and which contains polymeric chains selected from polysiloxanes, fluorinated chains and alkane chains.

In a preferred embodiment, said enameling lacquer also contains a second polymer comprising said chains of said copolymer and forming a polymer blend with said first polymer and said copolymer.

The base first polymer may be selected from any of the polymers currently used in enameling lacquers.

Said lacquer may contain between 0.5% and 20%, in particular between 1% and 10% by weight of copolymer.

It may be advantageous to add said second polymer to the mixture. The presence of the copolymer means that up to 30% by weight of said second polymer can be incorporated into the mixture instead of the previous maximum of 0.3%. The copolymer acts as a compatibilizing agent between the first and second polymers and forms a polymer blend which combines the properties of the two original polymers.

In another aspect, the present invention consists in a process for the synthesis of the above copolymer containing polysiloxane functions and being compatible with a first polymer selected from polyamide imide, polyester, polyester imide, polyester amide-imide, polyamide, polyimide, polyurethane and acetal of polyvinyl alcohol.

The process consists in reacting a functionalized polysiloxane with a diisocyanate whose isocyanate function has been blocked and then grafting the blocked NCO polysiloxane thus obtained onto said first polymer.

The functionalized polysiloxane may be an aminated polysiloxane, for example. The isocyanate function is blocked by reaction with an alcoholic, aromatic or aliphatic reactant such as aliphatic alcohol, phenol, resorcinol, benzyl alcohol, phloroglucinol, etc.

In a further aspect, the present invention consists in an enameled wire comprising at least superficially an enamel obtained by reticulation of the lacquer described above. This enamel may be the base enamel or an overlay on a base enamel or a top layer or an external layer of said base enamel.

In a particularly preferred embodiment, the conducting element is in a thermal class greater than or equal to 200, with a smoothness at least equal to that obtained using an external superficial layer of paraffined polyamide 6—6.

Its overlay is polyamide imide based.

Any of the wires according to the invention can advantageously be furnished with an external lubricating agent selected from paraffin wax, oil, wax, polysiloxane compounds and fluorated chain compounds.

Further features and advantages of the present invention will become apparent from the following description of illustrative, non-limiting embodiments.

BRIEF DESCRIPTION OF THE DRAWINGS

In the attached drawing the single FIGURE is a highly schematic view of a section of an enameled wire using a lacquer in accordance with the present invention.

DETAILED DESCRIPTION OF THE INVENTION

Firstly, an enameling lacquer is produced comprising a polyamide imide base first polymer and a copolymer which is compatible with the first polymer and contains polysiloxane functions.

Synthesis of the copolymer will be described first. This is carried out in two stages: the first stage consists in synthesizing a blocked NCO polysiloxane and the second stage consists in grafting the blocked NCO polysiloxane onto the amide-imide chain.

During the first stage the polysiloxane, functionalized with an amino group, is reacted with a diisocyanate. Note that the polysiloxane can be functionalized using any group which will react with an isocyanate.

One of the two isocyanate functions is temporarily blocked by reaction with a monofunctional compound, for example a hydroxylated compound. This reaction is described by G. R. Griffin in an article in IEC Product Research and Development, vol. 1, No. 4, December 1962. Aliphatic alcohols, phenols, resorcinol, benzyl alcohol and phloroglucinol may be used, for example; these substances are readily displaced by nucleophilic substitution. Three examples of the synthesis of a blocked NCO polysiloxane are given below.

EXAMPLE 1

The following compounds were reacted together for one hour at 80° C.:

| | |
|---|---|
| toluene diisocyanate (TDI) | 174 g (1 mole) |
| m-cresol | 108 g (1 mole) |
| aminated polysiloxane | 329 g (1 mole $NH_2$) |
| N-methylpyrrolidone | 1 130 g |
| triethylamine | 1.8 g |

611 g of the blocked NCO polysiloxane No. 1 was obtained, of which the dry matter content was 35%.

EXAMPLE 2

The following compounds were reacted together for one hour at 80° C.:

| | |
|---|---|
| toluene diisocyanate (TDI) | 174 g (1 mole) |
| benzyl alcohol | 108 g (1 mole) |
| aminated polysiloxane | 1 229 g (1 mole $NH_2$) |
| N-methylpyrrolidone | 1 290 g |
| xylene | 1 943 g |
| triethylamine | 2.5 g |

1 511 g if the blocked NCO polysiloxane No. 2 was obtained, of which the dry matter content was 32%.

EXAMPLE 3

The following compounds were reacted together for one hour at 80° C.:

| | |
|---|---|
| toluene diisocyanate (TDI) | 174 g (1 mole) |
| phenol | 94 g (1 mole) |
| aminated polysiloxane | 1 707 g (1 mole $NH_2$) |
| N-methylpyrrolidone | 1 693 g |
| xylene | 2 540 g |

1 975 g of the blocked NCO polysiloxane No. 3 was obtained, of which the dry matter content was 32%.

The second stage of the synthesis of the copolymer consists in grafting the blocked NCO polysiloxane onto an amide-imide chain. Four examples of this second stage are given below (examples 4 to 7).

EXAMPLE 4

The following reactants were introduced into a reactor:

| | |
|---|---|
| blocked NCO polysiloxane No 1 | 611 g (1 eq blocked NCO) |
| trimellitic anhydride (TMA) | 240 g (1.25 moles) |
| terephthalic acid (TPA) | 41.5 g (0.25 moles) |
| toluene diisocyanate (TDI) | 174 g (1 mole) |
| N-methylpyrrolidone | 1 100 g |
| triethylamine | 8.5 g |

The solution in N-methylpyrrolidone which was formed was heated to 180° C. over four hours and maintained at this temperature for five hours. The product obtained was then cooled to room temperature and filtered. The dry material yield was 27%.

EXAMPLE 5

The following reactants were introduced into a reactor:

| | |
|---|---|
| blocked NCO polysiloxane No 1 | 611 g (1 eq blocked NCO) |
| trimellitic anhydride (TMA) | 240 g (1.25 moles) |
| terephthalic acid (TPA) | 41.5 g (0.25 moles) |
| N-methylpyrrolidone | 1 100 g |
| triethylamine | 8.5 g |

The solution in N-methylpyrrolidone which was formed was heated to 180° C. over one hour and maintained at this temperature for one hour. The product obtained was then cooled to room temperature. 174 g (1 mole) of toluene diisocyanate TDI was then added and the mixture heated to 180° C. over three hours: this temperature was maintained for two hours, then increased to 190° C. for two hours. The product obtained was cooled to room temperature and filtered.

The method of this example prevents the reaction rate becoming too high when the temperature is raised.

EXAMPLE 6

The following reactants were introduced into a flask:

| | |
|---|---|
| blocked NCO polysiloxane No 3 | 1 975 g (1 eq blocked NCO) |
| trimellitic anhydride (TMA) | 192 g (1 mole) |
| terephthalic acid (TPA) | 83 g (0.5 mole) |
| toluene diisocyanate (TDI) | 174 g (1 mole) |
| N-methylpyrrolidone | 500 g |
| xylene | 800 g |
| triethylamine | 8.3 g |

The solution was heated to 170° C. over three hours and maintained at this temperature for six hours. The product obtained was then cooled and filtered at 100° C. The dry material yield was 28.5%.

EXAMPLE 7

The following reactants were introduced into a reactor:

| | |
|---|---|
| blocked NCO polysiloxane No 2 | 1 511 g (1 eq blocked NCO) |
| trimellitic anhydride (TMA) | 268.8 g (1.4 moles) |
| terephthalic acid (TPA) | 16.6 g (0.1 mole) |
| toluene diisocyanate (TDI) | 174 g (1 mole) |
| N-methylpyrrolidone | 626 g |
| xylene | 940 g |
| triethylamine | 8.5 g |

These substances were brought to 170° C. over three hours and maintained at this temperature for six hours. The product was cooled and filtered at room temperature.

Examples 4 to 7 produce a polyamide-imide polysiloxane. However, the blocked NCO polysiloxanes of examples 1 to 3 may also be used to produce other copolymers in accordance with the invention as shown in tables I to IV.

Table I depicts an embodiment wherein the blocked NCO polysiloxane is combined with a polyester, polyesterimide or polyamide.

Table II depicts further embodiments which produce a polysiloxane polyamide-imide and a polysiloxane polyester imide.

Table III depicts a further embodiment which produces a polysiloxane polyimide. "A" represents dianhydride.

Table IV depicts a further embodiment which produces a polysiloxane polyurethane.

The following examples of applications illustrate the production of enameled wires using the method explained below.

Lacquers were applied in successive thin layers onto the wire to be coated. The quantity of lacquer used in each application was calibrated by means of a felt wiper in the case of wires with a diameter of 0.07 mm or less or by means of a die in the case of wires with a diameter greater than 0.07 mm. The lacquer coated wire was then passed immediately into an oven at a temperature of between 500° C. and 750° C. The solvents evaporated off and the material was reticulated during this heat treatment. The operation was repeated without interruption until an enamel of the desired thickness was obtained.

FIG. 1 shows a wire comprising a metallic core 1 having a base enamel 2, an overlayer 3 of a different enamel and a smooth enamel layer 4 in accordance with the invention. This layer is obtained by coating with the lacquer according to the invention, followed by reticulation.

The base enamel 2 is a class H polyesterimide. The overlayer 3 is a polyamide. The layer 4 according to the invention is a polymer blend comprising a first polymer, a second polymer and a copolymer which compatibilizes the first and second polymers. The first polymer is a polyamide imide (AI). The second polymer is a polysiloxane oil selected from oils from the 47 V series from Rhone-Poulenc, oils from the M series from Bayer, or oils from the AK series from Wacker.

Table V shows the properties of the oils concerned. The copolymer (CH2, CA3, of CA4 of Table VI) acting as a compatibilizing agent between the polyamide imide and the polysiloxane oil was synthesized by one of the methods described above (examples 1 to 7).

The characteristics of three samples of the enameled wire according to the invention were examined (samples 3 to 5 in Table VI).

For comparison purposes, samples Nos. 1 and 2 are from the prior art; in sample No. 1, the wire has only an external overlayer 3 of polyamide imide with or without paraffin wax; in sample 2, the wire has an extra external coating of nylon with or without paraffin wax.

The slippery qualities of the various enameled electrical conductors were evaluated using a method known as the rope method, published for example in the journal "Cuivre Laiton et Alliage" No. 126, 1973, pages 13–18.

In this method, a rope is formed from two plys of the conductor to be tested. At one end of the rope, the end of one ply is attached to a fixed point and at the other end of the rope the end of the other ply is attached to a dynamometer. The slippery qualities of the conductor are measured in terms of the force required to obtain a uniform displacement of one of the plys with respect to the other. Regularity of the slippery qualities of the conductor is evaluated by comparing the results of several identical measurements made on ropes formed from other sections of the same conductor.

For these measurements, the rope was made in accordance with French standard NF C 26310.

Table VI shows the sliding force in newtons and the dispersion shown by comparing the results of a dozen measurements.

Sample No. 1 had a poor slip coefficient and an external lubricant reduced the force needed to 28.4 newtons with a far greater dispersion (mean standard deviation 4.50 newtons).

Sample No. 2 had an overlayer of nylon which reduced the force required to 18 newtons but did not resolve the dispersion in the slip coefficient; this was still too high at 2.10 newtons. Further, the nylon overlayer applied to the base enamel systematically reduced the initial temperature class of this base enamel.

Use of an external lubricant for sample No. 2 reduced the force to 9.20 newtons. However, dispersion in the slip coefficient remained high at 1.20 newtons.

The slip coefficient for samples 3 and 4 in accordance with the invention and without external lubrication with paraffin wax was improved by a factor of 3 to 4 over that of the prior art sample 1, using paraffin wax. Dispersion was reduced by a factor of 4 to 5.

A surprising and particularly interesting result was observed when the conductor according to the invention was further provided with extra external lubrication. In sample No. 5, the dispersion was zero, but generally the slip coefficient of conductors enameled according to the invention is regular.

It should also be noted that conductors enameled according to the invention retain all the properties of polyamide imides, i.e. all their mechanical, chemical, electrical and thermal properties. Further, their adherence, flexibility, resistance to thermal shock and thermoplasticity are not altered by the fact that the polyamide imide has been compounded with a polysiloxane. The thermal class of the conductor is also not changed.

The invention is not limited to the embodiments described herein. Any means may be replaced by an equivalent means without departing from the scope of the invention.

TABLE I

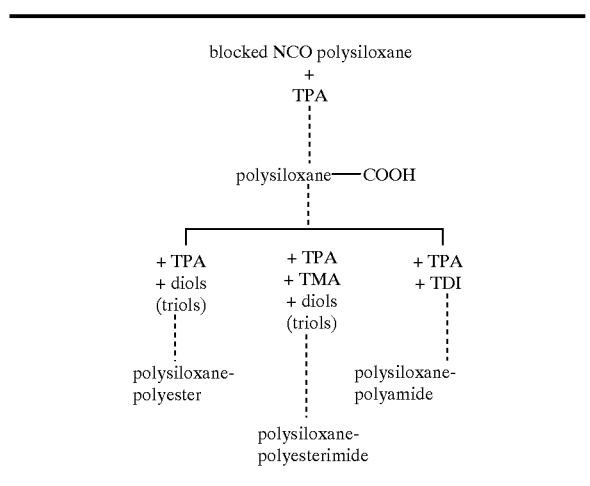

TABLE II

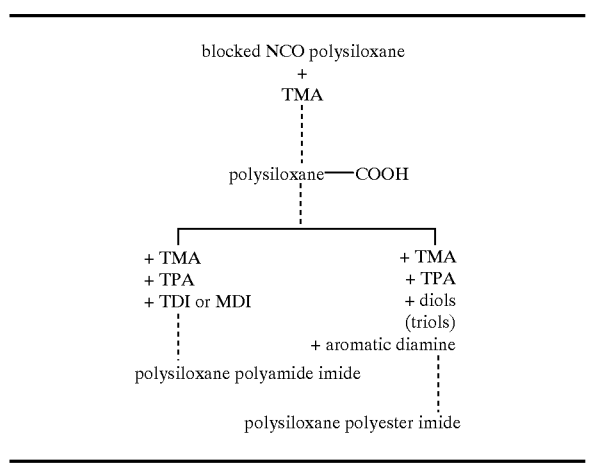

TABLE III

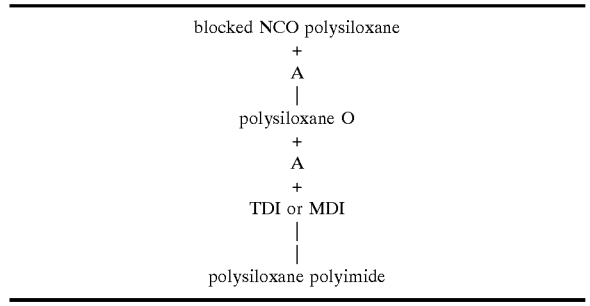

TABLE IV

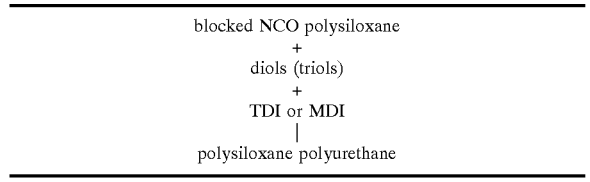

TABLE V

| | Series 47V oil | Series M oil | Series AK oil |
|---|---|---|---|
| Appearance | clear colourless | clear colourless | clear colourless |
| Dry extract, % | 100 | 100 | 100 |
| Viscosity at 25° C. in mm²/s | 5 to 1000 | 5 to 1000 | 5 to 1000 |

TABLE VI

| Sample No | Composition | Lubricant | Slipping force (newtons) | Deviation |
|---|---|---|---|---|
| 1 prior art | Al | none<br>paraffin wax | no slipping<br>28.4 | 4.5 |
| 2 prior art | Al<br>+ nylon overlayer | none<br>paraffin wax | 18.00<br>9.20 | 2.10<br>1.2 |
| 3 | Al + overlayer composition:<br>Al 76%<br>polysiloxane 20%<br>CA2 4% | none<br>paraffin wax | 8.00<br>7.10 | 0.96<br>0.52 |
| 4 | Al + overlayer composition:<br>Al 84%<br>polysiloxane 13.3%<br>CA3 2.7% | none<br>paraffin wax | 7.20<br>6.6 | 1.08<br>0.68 |
| 5 | Al + overlayer compound:<br>Al 91.7%<br>polysiloxane 7.2%<br>CA4 1.1% | none<br>paraffin wax | 6.70<br>6.50 | 0.50<br>0 |

There is claimed:

1. An insulating enameling lacquer for enameled conductors comprising a polymer blend of a base first polymer, a second polymer and a copolymer, wherein:
   the base first polymer is selected from the group consisting of:
   polyurethane, polyamide, polyamide imide, polyester, polyester imide, polyester amide-imide, polyamide, acetal of polyvinyl alcohol, polyepoxy compounds and polyphenoxy compounds;
   the second polymer is selected from the group consisting of polysiloxanes;
   said second polymer is present in the blend in a quantity of at least 0.3% but less than 30% by weight; and
   the copolymer is compatible with said first polymer, is distinct from the first and second polymers, and contains polymeric chains selected from polysiloxanes, said copolymer is present in the blend in a quantity between 0.5% and 20% by weight and acts as a compatibilizing agent between the first and second polymer to thereby create said polymer blend.

2. An enameling lacquer according to claim 1 wherein the quantity of said copolymer in the blend is between 1% and 10% by weight.

3. An enameling lacquer according to claim 2 wherein the quantity of said copolymer is between 1.1% and 4% by weight.

4. An enameling lacquer according to claim 1 wherein the quantity of said second polymer is between 7.2% and 20% by weight.

5. An enameling lacquer according to claim 4 wherein the quantity of said copolymer is between 1.1% and 4% by weight, and the quantity of said first polymer is between 76% and 91.7% by weight.

6. An enameling lacquer according to claim 5 wherein the second polymer is a polysiloxane oil.

7. An enameling lacquer according to claim 3 wherein the quantity of said first polymer is between 76% and 91.7% by weight.

8. The insulating enamel lacquer of claim 1, wherein the second polymer is present in the polymer blend in an amount of at least about 7.2%.

9. A process for the production of an insulating enameling lacquer in the form of a polymer blend comprising a base first polymer selected from the group consisting of: polyurethane, polyamide, polyamide imide, polyester, polyester imide, polyester amide-imide, polyamide, acetal of polyvinyl alcohol, polyepoxy compounds and polyphenoxy compounds; a second polymer selected from among polysiloxanes; and a copolymer which is compatible with said first polymer, which is distinct from the first and second polymers, which serves as a compatibilizing agent between the first and second polymers to thereby create said polymer blend, and which contains polymeric chains selected from polysiloxanes; said process comprising the steps:

producing a copolymer containing polysiloxane functions grafted onto a polymer selected from the group consisting of: polyamide imide, polyester, polyester imide, polyester amide-imide, polyamide, polyamide and polyurethane, by first reacting a functionalized polysiloxane with a diisocyanate wherein one isocyanate function has been blocked and then grafting the blocked NCO polysiloxane onto said first polymer, and adding the copolymer thus produced to the base first polymer and the second polymer to form a polymer blend in which the second polymer is present in a quantity between 7.2% and 20% by weight and the copolymer is present in a quantity between 0.5% and 20% by weight.

10. Process according to claim 9 wherein said functionalized polysiloxane is an aminated polysiloxane.

11. Process according to claim 9 wherein blocking of said isocyanate function is effected by reaction with an alcoholic, aliphatic or aromatic reactant selected from aliphatic alcohol, phenol, resorcinol, benzyl alcohol and phloroglucinol.

12. An enameled wire which comprises an external layer of an enamel in the form of a polymer blend obtained by reticulation of an enameling lacquer, said enameling lacquer comprising a base first polymer selected from the group consisting of: polyurethane, polyamide, polyamide imide, polyester, polyester imide, polyester amide-imide, polyamide, acetal of polyvinyl alcohol, polyepoxy compounds and polyphenoxy compounds;

a second polymer selected from among polysiloxanes and present in the blend in a quantity of at least 0.3% but less than 30% by weight, and a copolymer which is compatible with said first polymer, which is distinct from the first and second polymers, which serves as a compatibilizing agent between the first and second polymers to thereby create said polymer blend, and which contains polymeric chains selected from polysiloxanes, with said copolymer being present in the blend in a quantity between 0.5% and 20% by weight and acting as a compatibilizing agent between the first and second polymer to thereby create said polymer blend.

13. An enameled wire according to claim 12 wherein said external layer of enamel constitutes an overlayer or top layer on a base enamel.

14. An enameled wire according to claim 12 in a thermal class of greater than or equal to class 200 with a smoothness, as measured by the rope method using a rope made in accordance with French standard NF CX 26310, at least equal to that obtained using an external layer of paraffined polyamide 6—6.

15. An enameled wire according to claim 14 wherein the enamel overlayer is polyamide-imide based.

16. An enameled wire according to claim 12 further comprising a superficial external lubricating agent selected from paraffin wax, oil, wax, polysiloxane compounds and fluorated chain compounds.

17. The enameled wire of claim 12, wherein the second polymer is present in the polymer blend in an amount of at least about 7.2%.

* * * * *